US012743106B2

(12) United States Patent
Zhang

(10) Patent No.: US 12,743,106 B2
(45) Date of Patent: Sep. 22, 2026

(54) TASK PROCESSING METHOD FOR A PLURALITY OF ROBOTS, AND ROBOT

(71) Applicant: BEIJING JINGDONG QIANSHI TECHNOLOGY CO., LTD., Beijing (CN)

(72) Inventor: Lei Zhang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 216 days.

(21) Appl. No.: 18/690,445

(22) PCT Filed: Jul. 7, 2022

(86) PCT No.: PCT/CN2022/104360

§ 371 (c)(1),
(2) Date: Mar. 8, 2024

(87) PCT Pub. No.: WO2023/035755

PCT Pub. Date: Mar. 16, 2023

(65) Prior Publication Data

US 2024/0411327 A1 Dec. 12, 2024

(30) Foreign Application Priority Data

Sep. 10, 2021 (CN) ......................... 202111061331.2

(51) Int. Cl.
*G05D 1/69* (2024.01)
*G05D 111/30* (2024.01)
(Continued)

(52) U.S. Cl.
CPC .............. *G05D 1/69* (2024.01); *H04W 4/023* (2013.01); *H04W 4/46* (2018.02); *G05D 2111/32* (2024.01)

(58) Field of Classification Search
CPC ..... G05D 1/69; G05D 2111/32; H04W 4/023; H04W 4/46; B25J 9/0084; G06F 11/0793;
(Continued)

(56) References Cited

U.S. PATENT DOCUMENTS 7,969,914 B1 * 6/2011 Gerber ................ H04W 40/246
9,246,749 B1 1/2016 Nguyen
(Continued)

FOREIGN PATENT DOCUMENTS

CN 101364110 A 2/2009
CN 102023571 A 4/2011
(Continued)

OTHER PUBLICATIONS

Machine Translation of CN-111491031-A (Year: 2020).*
(Continued)

*Primary Examiner* — Ellis B. Ramirez
(74) *Attorney, Agent, or Firm* — Myers Bigel, P.A.

(57) ABSTRACT

The present disclosure relates to a task processing method for a plurality of robots, and a robot. The task processing method includes: identifying at least one robot of the plurality of robots as a disconnected robot in case that a heartbeat connection between the at least one robot and the task processing device is detected to be lost; obtaining a historical position of the disconnected robot and a current position of a connected robot of the plurality of robots; for the disconnected robot, determining a target sending robot corresponding to the disconnected robot from the plurality of robots according to the historical position of the disconnected robot and a current position of the connected robot; and sending task information of a current task of the disconnected robot to the disconnected robot through the target sending robot.

16 Claims, 5 Drawing Sheets

(51) Int. Cl.
*H04W 4/02* (2018.01)
*H04W 4/46* (2018.01)

(58) Field of Classification Search
CPC ....... H04L 12/12; H04L 67/10; G05B 19/042; G05B 19/0423; G05B 2219/25257; Y02P 90/02
USPC .................. 700/248; 701/3, 6, 20; 709/221; 714/4.21, 6.31; 340/384.2
See application file for complete search history.

(56) References Cited

U.S. PATENT DOCUMENTS 10,555,238 B1 * 2/2020 Wu ......................... H04L 67/12
2003/0005102 A1 * 1/2003 Russell ............... H04L 41/0213
2003/0012168 A1 * 1/2003 Elson ........................ G01S 5/18
2006/0149824 A1 * 7/2006 Park ...................... H04L 67/125
2011/0245996 A1 * 10/2011 Orsulak ................. G05D 1/101
2012/0294155 A1 * 11/2012 Yin ....................... H04W 24/04
2015/0341447 A1 * 11/2015 Patil ........................ H04L 43/10
2017/0173784 A1 * 6/2017 Shah .................. H04L 63/0428
2017/0201858 A1 * 7/2017 Li ......................... G06Q 50/01
2018/0203462 A1 7/2018 Sugiyama et al.
2019/0240834 A1 8/2019 Yi
2019/0349426 A1 * 11/2019 Smith ................... H04L 63/123
2020/0076684 A1 * 3/2020 Naveen ................... H04L 45/42
2020/0252291 A1 * 8/2020 Mittal ................. H04L 41/5077

FOREIGN PATENT DOCUMENTS

CN 103587869 A 2/2014
CN 104238552 A 12/2014
CN 106856590 A 6/2017
CN 206363160 U 7/2017
CN 107322594 A 11/2017
CN 207650635 U 7/2018
CN 109877831 A 6/2019
CN 110703751 A 1/2020
CN 111427683 A 7/2020
CN 111491031 A * 8/2020 ............ H04L 67/52
CN 112395124 A 2/2021
CN 113179491 A 7/2021
CN 113246117 A 8/2021
CN 113741297 A 12/2021
EP 3120597 B1 8/2018
EP 3693821 A1 * 8/2020 ......... G05B 19/4185
JP 2005014150 A 1/2005
JP 2010003240 A 1/2010
JP 2018116359 A 7/2018
JP 2018147401 A 9/2018
WO WO-2021179658 A1 * 9/2021 ................ B25J 5/00

OTHER PUBLICATIONS

"Notice of Reasons for Refusal" and English translation, JP Application No. 2024-515480, Jul. 29, 2025, 8 pp.

"Communication with Supplementary Search Report", EP Application No. 22866230.0, Apr. 4, 2025, 18 pp.

First Office Action with English language translation for CN Application No. 202111061331.2 (13 pages) (Nov. 29, 2022).

International Search Report and English language translation for PCT Application No. PCT/CN2022104360, 7 pages (mailed Aug. 23, 2022).

Lifei, Zhong "Research on wireless communication system of ability Storm intelligent robot" Hunan Institute of Science and Technology experimental training center (2 pages) (Apr. 2020).

Xin, Liu "Research on collaborative control of multi-mobile robots based on wireless ad hoc network" Thesis (66 pages) (Jun. 7, 2014).

Yang et al. "Multi-mobile-robot Cooperation Control Research based on wireless ad-hoc network" Journal of Chongqing University of Posts and Telecommunications (3 pages) (Jun. 2006).

* cited by examiner

TASK PROCESSING METHOD FOR A PLURALITY OF ROBOTS, AND ROBOT

CROSS-REFERENCE TO RELATED APPLICATIONS

This application is a U.S. National Stage Application under 35 U.S.C. § 371 of International Patent Application No. PCT/CN2022/104360, filed Jul. 7, 2022, which itself is based on and claims the benefit of priority to Chinese patent application No. 202111061331.2 filed on Sep. 10, 2021, both of which are hereby incorporated by reference their entireties into the present application.

TECHNICAL FIELD

The present disclosure relates to the field of computer technology, in particular to a task processing method, device and system for a plurality of robots, a robot and a computer storage medium.

BACKGROUND

A robot refers to a machine device that automatically performs a series of complicated operations or functions by receiving instructions according to a preset program. A logistics robot refers to a robot that is applied to operations such as goods transfer and handling in scenes such as warehousing, sorting centers, and goods in transit. The logistics robot is also gradually regarded as an important intelligent infrastructure for logistics and supply chain related enterprises during the process of digitalization and automation.

In the related art, the robot periodically reports a position of the robot to the console through the WIFI network to maintain a heartbeat connection with the console, and the console sends to each robot the task information of a current task corresponding to each robot through the WIFI network.

SUMMARY

According to a first aspect of the present disclosure, a task processing method for a plurality of robots is provided. The method is performed by a task processing device, wherein the task processing device and the plurality of robots are both deployed with a first communication module configured to perform bidirectional communication between the plurality of robots and the task processing device, the plurality of robots further include a second communication module configured to perform bidirectional communication between the plurality of robots, and the task processing method comprises: identifying at least one robot as a disconnected robot in case that that the heartbeat connection between the at least one robot and the task processing device is detected to be lost; obtaining a historical position of the disconnected robot and a current position of a connected robot of the plurality of robots, wherein the connected robot is a robot that maintains a heartbeat connection with the task processing device; for the disconnected robot, determining a target sending robot corresponding to the disconnected robot from the plurality of robots according to the historical position of the disconnected robot and a current position of the connected robot, wherein the target sending robot comprises the connected robot; and sending task information of a current task of the disconnected robot to the disconnected robot through the target sending robot.

In some embodiments, the determining the target sending robot corresponding to the disconnected robot from the plurality of robots comprises: obtaining a historical position of another disconnected robot than the disconnected robot in case that each of distances between current positions of the connected robot and a historical position of the disconnected robot is greater than a distance threshold; determining the another disconnected robot, of which a historical position is at a distance from the historical position of the disconnected robot less than or equal to the distance threshold as a candidate disconnected robot according to the historical position of the another robot; determining the connected robot of which current position is at a distance from a historical position of the candidate disconnected robot less than or equal to the distance threshold as a candidate connected robot according to the historical position of the candidate disconnected robot and the current position of the connected robot; and determining a target disconnected robot and a target connected robot corresponding to the disconnected robot from the candidate disconnected robot and the candidate connected robot as the target sending robot respectively.

In some embodiments, the sending the task information of the current task of the disconnected robot to the disconnected robot through the target sending robot comprises: sending the task information of the current task to the disconnected robot through the target connected robot and the target disconnected robot sequentially.

In some embodiments, the task processing method further comprises: sending task information of a current task of the target disconnected robot to the target disconnected robot through the target connected robot.

In some embodiments, the task processing method further comprises: determining a target receiving robot corresponding to the disconnected robot from the plurality of robots, wherein the target robot is configured to receive a result of performing a current task sent from the disconnected robot through the second communication module; and receiving the result of performing the current task through the target receiving robot, wherein the target receiving robot comprises the connected robot.

In some embodiments, the receiving the result of performing the current task by the target receiving robot comprises: receiving the result of performing the current task sent from the target receiving robot in case that the target receiving robot only comprises the connected robot; and receiving the result of performing the current task through the disconnected robot of the target receiving robot and the connected robot of the target receiving robot sequentially in case that the target receiving robot comprises the disconnected robot and the connected robot.

In some embodiments, the target receiving robot and the target sending robot are completely same, partially same or completely different.

In some embodiments, the determining the target sending robot corresponding to the disconnected robot from the plurality of robots comprises: determining the target sending robot corresponding to the disconnected robot from at least one connected robot in case that the distance between a current position of the at least one connected robot and the historical position of the disconnected robot is less than or equal to the distance threshold.

In some embodiments, the determining a target sending robot corresponding to the disconnected robot from the at least one connected robot comprises: determining the connected robot of which a current position is at the shortest distance from the historical position of the disconnected robot from the at least one connected robot as the target sending robot corresponding to the disconnected robot.

In some embodiments, a difference between a wireless propagation distance of the second communication module and a wireless propagation distance of the first communication module is greater than a difference threshold under a same power consumption, where the difference and the difference threshold are positive integers.

In some embodiments, a current task is a follow task, and the second communication module is further configured to exchange real-time motion parameters, positions and road condition information between the plurality of robots performing the follow task.

In some embodiments, the motion parameters comprise at least one of a velocity, an acceleration or a direction.

In some embodiments, the first communication module is a WIFI module, and the second communication module is a long-range radio LORA module.

According to a second aspect of the present disclosure, a task processing device for a plurality of robots is provided, wherein the task processing device and the plurality of robots are both deployed with a first communication module configured to perform bidirectional communication between the plurality of robots and the task processing device, the plurality of robots further comprise a second communication module configured to perform bidirectional communication between the plurality of robots, and the task processing device comprises: an identifier module configured to identify at least one robot of the plurality of robots as a disconnected robot in case that a heartbeat connection between the at least one robot and the task processing device is detected to be lost; an obtaining module configured to obtain a historical position of the disconnected robot and a current position of a connected robot of the plurality of robots, wherein the connected robot is a robot that maintains a heartbeat connection with the task processing device; a determining module configured to, for the disconnected robot, determine a target sending robot corresponding to the disconnected robot from the plurality of robots according to the historical position of the disconnected robot and a current position of the connected robot, wherein the target sending robot comprises the connected robot; and a sending module configured to send task information of a current task of the disconnected robot to the disconnected robot through the target sending robot.

According to a third aspect of the present disclosure, a task processing method for a plurality of robots is provided. The method comprises a first communication module and a second communication module, wherein the first communication module is configured to perform bidirectional communication between the plurality of robots and a first communication module of a task processing device, and the second communication module is configured to perform bidirectional communication between the plurality of robots, the task processing method is performed by a robot of the plurality of robot, and the task processing method comprises: receiving task information of a current task of a disconnected robot sent from the task processing device through the first communication module, and sending the task information of the current task of the disconnected robot to the disconnected robot through the second communication module in case that a heartbeat connection between the robot and the task processing device is not lost and the robot is determined as a target sending robot corresponding to the disconnected robot, wherein the disconnected robot is a robot whose heartbeat connection with the task processing device is lost; receiving task information of a current task of the robot sent from the target sending robot corresponding to the robot through the second communication module in case that a heartbeat connection between the robot and the task processing device is lost, wherein the target sending robot comprises a connected robot; and in case that a heartbeat connection between the robot and the task processing device is lost and the robot is determined as a target sending robot corresponding to another disconnected robot, receiving task information of a current task of the another disconnected robot sent from another target sending robot through the second communication module, and sending the task information of the current task of the another disconnected robot to the another disconnected robot wherein the another target sending robot comprises the connected robot.

In some embodiments, the target sending robot comprises at least one robot at a distance from a corresponding disconnected robot less than or equal to a distance threshold, and in case that there are a plurality of target sending robots, series paths constituted by the plurality of target sending robots comprise a series path, in which the distance between any two adjacent target sending robots is less than or equal to the distance threshold.

According to a fourth aspect of the present disclosure, a robot is provided. The robot comprises: a first communication module configured to perform bidirectional communication with a first communication module of a task processing device; and a second communication module configured to perform bidirectional communication with a second communication module of other robots; wherein: task information of a current task of a disconnected robot sent from the task processing device is received through the first communication module, and the task information of the current task of the disconnected robot is sent to the disconnected robot through the second communication module in case that a heartbeat connection between the robot and the task processing device is not lost and the robot is determined as a target sending robot corresponding to the disconnected robot, wherein the disconnected robot is a robot whose heartbeat connection with the task processing device is lost; task information of a current task of the robot sent from a target sending robot corresponding to the robot is received through the second communication module, wherein the target sending robot comprises a connected robot in case that a heartbeat connection between the robot and the task processing device is lost; and in case that a heartbeat connection between the robot and the task processing device is lost and the robot is determined as a target sending robot corresponding to another disconnected robot, task information of a current task of the another disconnected robot sent from another target sending robot is received through the second communication module, and the task information of the current task of the another disconnected robot is sent to the another disconnected robot, wherein the another target sending robot comprises the connected robot.

In some embodiments, the target sending robot comprises at least one robot at a distance from a corresponding disconnected robot less than or equal to a distance threshold, and in case that there are a plurality of target sending robots, series paths constituted by the plurality of target sending robots comprise a series path, in which the distance between any two adjacent target sending robots is less than or equal to the distance threshold.

According to a fifth aspect of the present disclosure, an electronic device is provided. The device comprises: a memory; and a processor coupled to the memory, wherein the processor is configured to perform the task processing method according to any of the above-described embodiments based on instructions stored in the memory.

According to a sixth aspect of the present disclosure, a task processing system for a plurality of robots is provided. The system comprises: the task processing device according to any of the above-described embodiments.

In some embodiments, the task processing system further comprises: a target sending robot configured to receive the task information of a current task of disconnected robot from the task processing device through a first communication module, and send the task information of a current task to disconnected robot through the second communication module.

According to a seventh aspect of the present disclosure, a non-transitory computer-readable medium is provided. The medium has computer program instructions stored thereon that, when executed by a processor, implement the task processing method according to any of the above-described embodiments.

BRIEF DESCRIPTION OF THE ACCOMPANYING DRAWINGS

The accompanying drawings which constitute a part of this specification, illustrate the embodiments of the present disclosure, and together with this specification, serve to explain the principles of the present disclosure.

The present disclosure may be more explicitly understood from the following detailed description with reference to the accompanying drawings, in which.

DETAILED DESCRIPTION

Various exemplary embodiments of the present disclosure will now be described in detail with reference to the accompanying drawings. It should be noted that: unless additionally specified, the relative arrangements, numerical expressions and numerical values of the components and steps expounded in these examples do not limit the scope of the present disclosure.

At the same time, it should be understood that, for ease of description, the dimensions of various parts shown in the accompanying drawings are not drawn according to actual proportional relations.

The following descriptions of at least one exemplary embodiment which are in fact merely illustrative, shall by no means serve as any delimitation on the present disclosure as well as its application or use.

The techniques, methods, and devices known to a common technical person in the relevant art may not be discussed in detail, but where appropriate, the techniques, methods, and devices should be considered as part of the description.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same in the subsequent accompanying drawings.

In the related art, the WIFI network is unstable, and once the robot is out of touch, it will be impossible for the console to send the task information of a current task to the robot through the WIFI network, which results in a discontinuous task processing process of the robot and a low success rate of task processing.

For the above-described technical problem, the present disclosure provides a task processing method, which may ensure the continuity of the task processing by a robot and improve the success rate of task processing.

Figure 1:
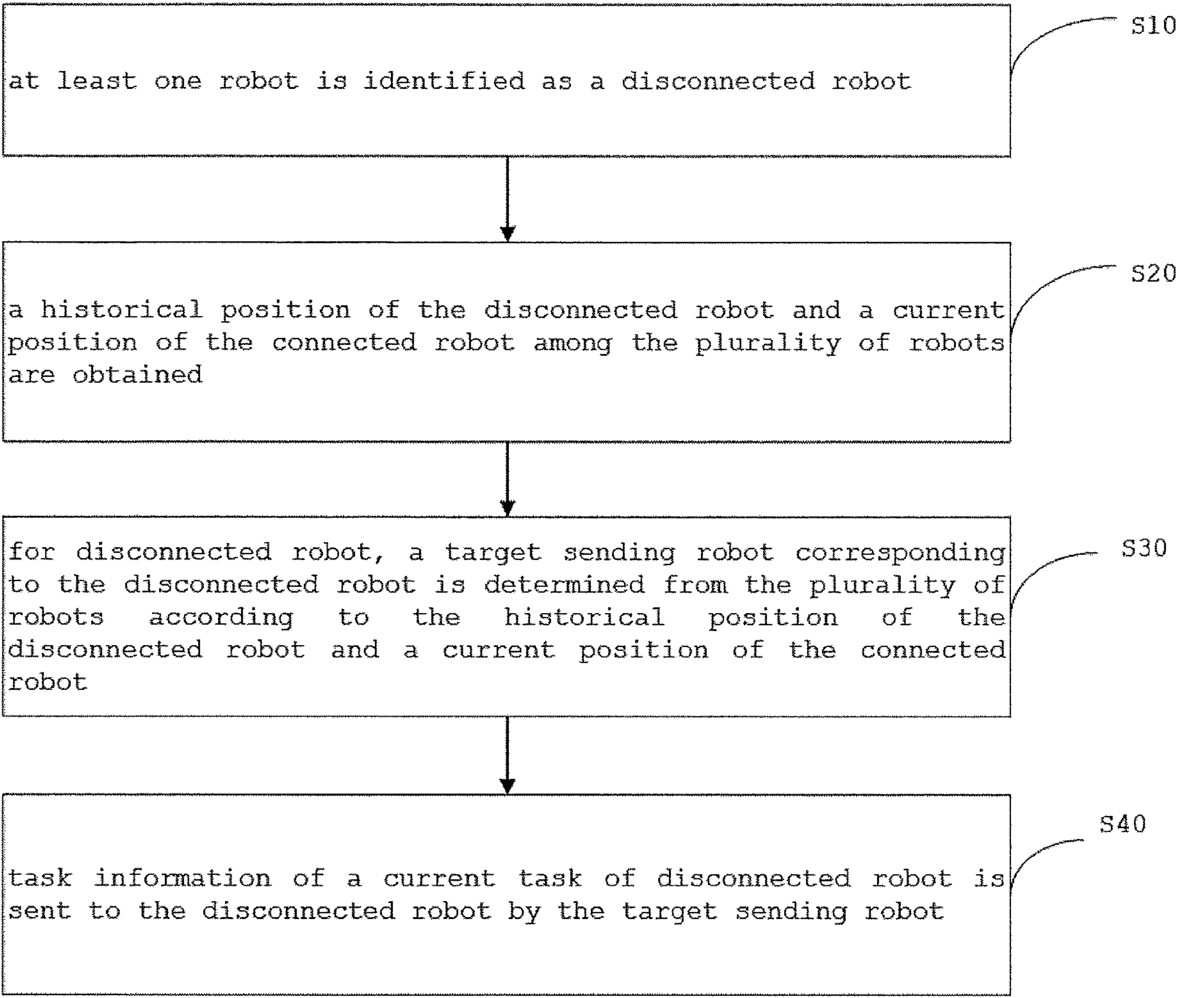
FIG. 1 is a flowchart showing a task processing method for a plurality of robots according to some embodiments of the present disclosure.

FIG. 1 is a flowchart showing a task processing method for a plurality of robots according to some embodiments of the present disclosure. The task processing method is performed by the task processing device. The task processing device and a plurality of robots are all deployed with a first communication module for bidirectional communication between the robot and the task processing device. The plurality of robots also comprise a second communication module for bidirectional communication between robots. For example, the task processing device is a console. For example, the robot is a logistics robot or a logistics trolley.

As shown in FIG. 1, the task processing method based on a plurality of robots comprises steps S10-S40.

In step S10, in case that it is detected that the heartbeat connection between at least one robot and the task processing device is lost, at least one robot is marked as a disconnected robot. The heartbeat connections of the present disclosure are all heartbeat connections based on the first communication module. In some embodiments, the heartbeat connection between the robot and the task processing device is determined to be lost in case that the task processing device does not receive a heartbeat message of the robot for a predetermined duration. For example, the predetermined duration is 500 milliseconds.

In step S20, a historical position of the disconnected robot and a current position of a connected robot of the plurality of robots are obtained. The connected robot is a robot that maintains a heartbeat connection with the task processing device. For example, the task processing device obtains a historical position of the disconnected robot reported for the last time from the database before the connection is lost. In some embodiments, a real-time position of the connected robot is obtained as a current position based on a heartbeat message. For example, the task processing device receives a heartbeat message through the first communication module.

In step S30, for disconnected robot, a target sending robot corresponding to the disconnected robot is determined from the plurality of robots according to a historical position of the disconnected robot and a current position of the connected robot. The target sending robot comprises a connected robot.

Figure 2:
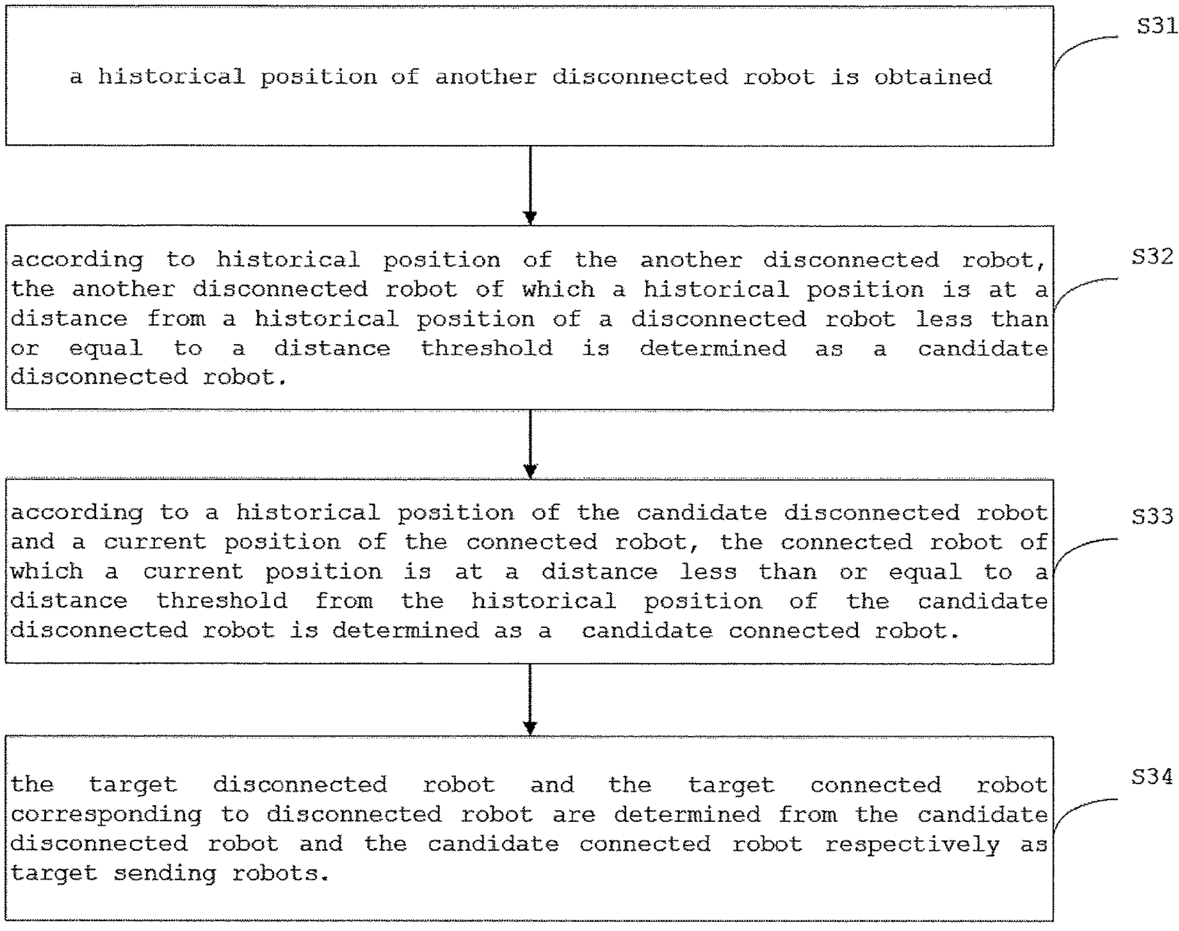
FIG. 2 is a flowchart showing the determining a target sending robot according to some embodiments of the present disclosure.

In some embodiments, the above-described step S30 may be realized by the steps shown in FIG. 2.

FIG. 2 is a flowchart showing the determining a target sending robot according to some embodiments of the present disclosure.

As shown in FIG. 2, the determining a target sending robot comprises steps S31-S34.

In step S31, in case that each of distances between current positions of connected robots and a historical position of the disconnected robot is greater than a distance threshold, a historical position of another disconnected robot is obtained. In some embodiments, the historical position of the another disconnected robot reported for the last time based on a heartbeat message is obtained from the database.

In step S32, according to the historical position of the another disconnected robot, the another disconnected robot of which a historical position is at a distance from a historical position of a disconnected robot less than or equal to a distance threshold is determined as a candidate disconnected robot.

In step S33, according to a historical position of the candidate disconnected robot and a current position of the connected robot, the connected robot of which current position is at a distance from historical position of the candidate disconnected robot less than or equal to a distance threshold is determined as a candidate connected robot.

In step S34, the target disconnected robot and the target connected robot corresponding to disconnected robot are determined from the candidate disconnected robot and the candidate connected robot respectively as target sending robots. In some embodiments, all candidate disconnected robots and candidate connected robots may be determined as target disconnected robots and target connected robots respectively. In other embodiments, the candidate disconnected robot closest to disconnected robot may also serve as a target disconnected robot, and the candidate connected robot closest to the target disconnected robot may serve as a target connected robot.

In the above-described embodiments, in case that a broadcast rescue cannot be carried out by a single connected robot, a current task may be forwarded by combining the disconnected robot, so as to realize the continuity of a task and improve the success rate of task processing.

A specific embodiment in case that the distance between a current position of the connected robot and a historical position of the disconnected robot is greater than a distance threshold will be described below in detail in conjunction with FIG. 3.

Figure 3:
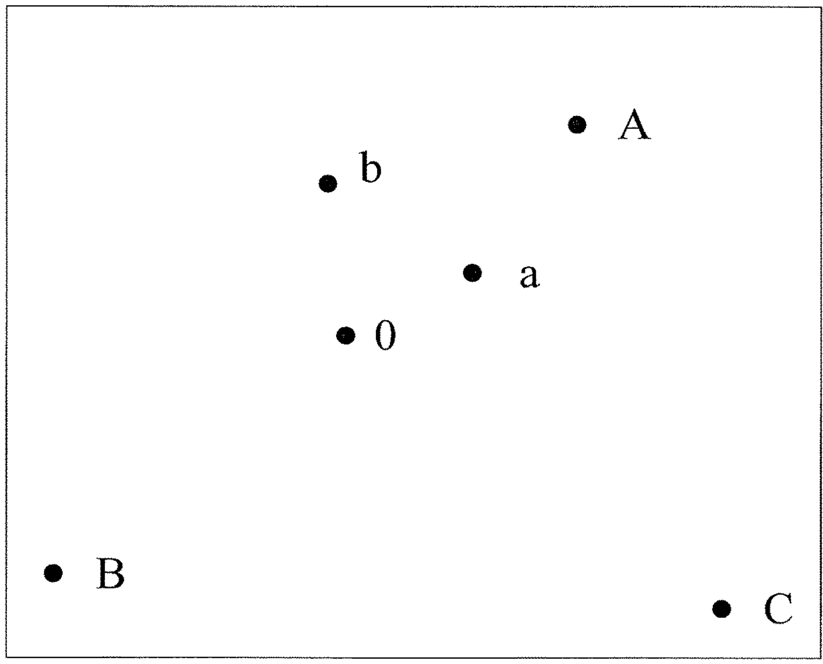
FIG. 3 is a schematic view showing the positions of a plurality of robots according to some embodiments of the present disclosure.

FIG. 3 is a schematic view showing the positions of a plurality of robots according to some embodiments of the present disclosure.

As shown in FIG. 3, at a certain moment, the robots '0', 'a' and 'b' that are all out of touch become disconnected robot. The robots 'A', 'B' and 'C' are all connected robots. For the robot '0', the distances between the robots 'a' and 'b' to the robot '0' are all less than or equal to a distance threshold, while the distances between the robots 'A', 'B' and 'C' to the robot '0' are all greater than a distance threshold. The distances between the robots 'a' and 'b' to the robot 'A' are less than or equal to a distance threshold, but the distances between robots 'a' and 'b' to the robots B and C are greater than a distance threshold. In this case, robots 'a' and 'b' are selected as candidate disconnected robots, and the robot 'A' is selected as a candidate connected robot.

For example, among the robots 'a' and 'b', the robot 'a' closest to the robot '0' may be regarded as the target disconnected robot. The robot 'A' serves as the target connected robot. The robot 'a' and the robot 'A' jointly serve as a target sending robot.

In some embodiments, in case that the distance between a current position of at least one connected robot and a historical position of disconnected robot is less than or equal to a distance threshold, target sending robot corresponding to the disconnected robot is determined from the at least one connected robot. For example, among the at least one connected robot, the connected robot of which current position is at the shortest distance from a historical position of disconnected robot is determined as a target sending robot corresponding to the disconnected robot.

A specific embodiment in case that the distance between a current position of at least one connected robot and a historical position of disconnected robot is less than or equal to a distance threshold will be described below in detail in conjunction with FIG. 4.

Figure 4:
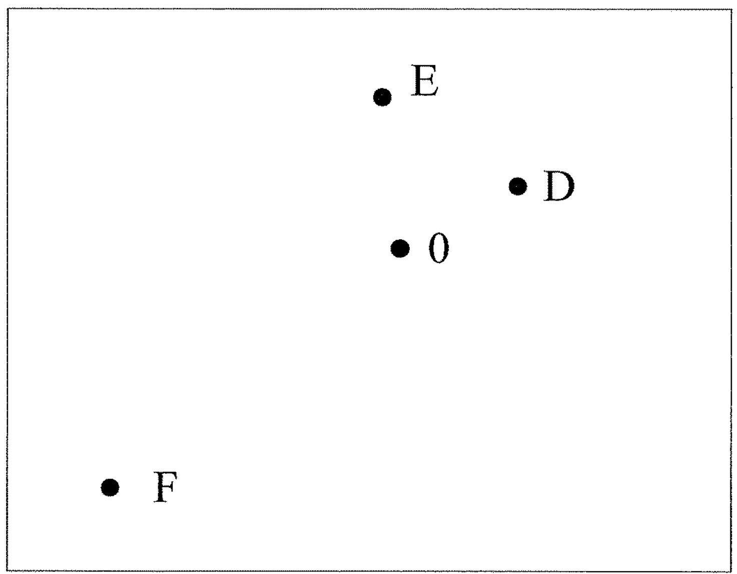
FIG. 4 is a schematic view showing the positions of a plurality of robots according to other embodiments of the present disclosure.

FIG. 4 is a schematic view showing the positions of a plurality of robots according to other embodiments of the present disclosure.

As shown in FIG. 4, at a certain moment, the robot '0' is out of touch, and the robots D, E and F are all connected robots. For the robot '0', the distances between the robots D and E to the robot '0' are less than or equal to a distance threshold, while the distance between robot F to the robot '0' is greater than a distance threshold.

For example, among the robots D and E, the robot D is closer to the robot '0', and the robot D is determined as the target sending robot.

Returning to FIG. 1, in step S40, a task information of a current task of the disconnected robot is sent to the disconnected robot by the target sending robot. In some embodiments, the task information comprises the identifier and task content of the robot performing the current task.

In some embodiments, in case that the target sending robot comprises a disconnected robot and a connected robot, the task information of a current task is sent to disconnected robot through the target connected robot and the target disconnected robot sequentially.

Taking FIG. 3 as an example, the task processing device sends the task information of a current task of the robot '0' to the robot 'A' through the first communication module. After receiving the task information of a current task through the first communication module, the robot 'A' finds that the robot identifier in the task information of a current task does not belong to the robot A, and then sends the task information of a current task to the robot 'a' through the second communication module. Similarly, after receiving the task information of a current task through the second communication module, the robot 'a' finds that the robot identifier in the task information of a current task does not belong to the robot a, and then sends the task information of a current task to the robot '0' through the second communication module. So far, the task processing device sends the task information of a current task of the robot '0' to the robot '0' through robot 'A' and the robot 'a' sequentially.

In some embodiments, in case that the target sending robot only comprises the connected robot, the task information of a current task is directly sent to disconnected robot through the connected robot among the target sending robot.

Taking FIG. 4 as an example, the task processing device sends the task information of a current task of the robot '0' to the robot D through the first communication module. After receiving the task information of a current task the first communication module, the robot D finds that the robot identifier in the task information of a current task does not belong to the robot D, and then sends the task information of a current task to the robot '0' through the second communication module.

In some embodiments, in case that the target sending robot comprises a disconnected robot and a connected robot, the task processing device also send the task information of a current task of the target disconnected robot to the target disconnected robot through the target connected robot. For example, the target processing device sends the task information of a current task of the target disconnected robot to the target connected robot through the first communication module, and then the target connected robot sends the task information of a current task of the target disconnected robot to the target disconnected robot through the second communication module. In this way, the current tasks of a plurality of disconnected robots are sent to corresponding disconnected robot, thereby improving the efficiency of delivering tasks by the task processing device and further improving the continuity of task processing.

In some embodiments, under a same power consumption, a difference between a wireless propagation distance of the second communication module and a wireless propagation distance of the first communication module is greater than a difference threshold, wherein the difference and the difference threshold are positive integers. That is, the wireless propagation distance of the second communication module is greater than that of the first communication module. For example, the first communication module is a WIFI module, and the second communication module is a LORA (Long-Range Radio) module.

In some embodiments, in case that a current task is a follow task, the second communication module is also configured to exchange real-time motion parameters, positions and road condition information between the robots performing a follow task. For example, the motion parameters comprise at least one of a velocity, an acceleration or a motion direction. The second communication module with a farther wireless transmission distance performs data transmission of a follow task, the success rate of a follow task and ensure safe driving between the robots is improved.

In some embodiments, a target receiving robot corresponding to disconnected robot is determined from the plurality of robots within a specified time after the task information of a current task of disconnected robot is sent to disconnected robot. A result of performing a current task is received through the target receiving robot. The target receiving robot comprises a connected robot. The target receiving robot is configured to receive a result of performing a current task sent from disconnected robot through the second communication module. For example, the specified time is an average time for disconnected robot to perform a task similar to a current task in a historical time period.

In some embodiments, the determining the target receiving robot corresponding to the disconnected robot from the plurality of robots is similar to the determining the target sending robot, which will not be described in detail here. In particular, when the target receiving robot is determined, a current position of the connected robot and a historical position of the disconnected robot at that moment again are obtained.

In some embodiments, a result of performing a current task sent from the target receiving robot is received in case that the target receiving robots are all connected robots. In case that the target receiving robot comprises a disconnected robot and a connected robot, a result of performing a current task is received through the disconnected robot in the target receiving robot and the connected robot in the target receiving robot sequentially.

That is, the disconnected robot sends a result of performing a current task to the second communication module of the disconnected robot in the target receiving robot through the second communication module, and then the disconnected robot in the target receiving robot sends the same to the second communication module of the connected robot in the target receiving robot through the second communication module, and then the connected robot in the target receiving robot sends the same to the task processing device through the first communication module.

For example, the target receiving robot may also forward the heartbeat information, the current position information, the motion parameter information and the like of disconnected robot in addition to forwarding a result of performing a current task.

In some embodiments, the target receiving robot and the target sending robot are completely same, partially same or completely different. For example, the target sending robots are robots 1, 2 and 3, and the target receiving robots might be robots 1, 2 and 3, the robots 2, 3 and 4, and the robots 4, 5 and 6.

In some embodiments, the task processing device also periodically monitors whether the heartbeat connection of disconnected robot is resumed, the disconnected robot is identified as a connected robot again and the task information is sent to the robot through the first communication module in case that the heartbeat connection of a disconnected robot is resumed.

In the above-described embodiments, the robot is deployed with the first communication module for bidirectional communication with the task processing device, and also deployed with the second communication module for bidirectional communication with other robots. In case that the task processing device cannot send the task information of a current task since the first communication module is not available, the connected robot may serve as a device in between to send the task information of a current task to a corresponding disconnected robot. In this way, it is possible to ensure the continuity of task processing by the robot and improve the success rate of task processing.

Figure 5:
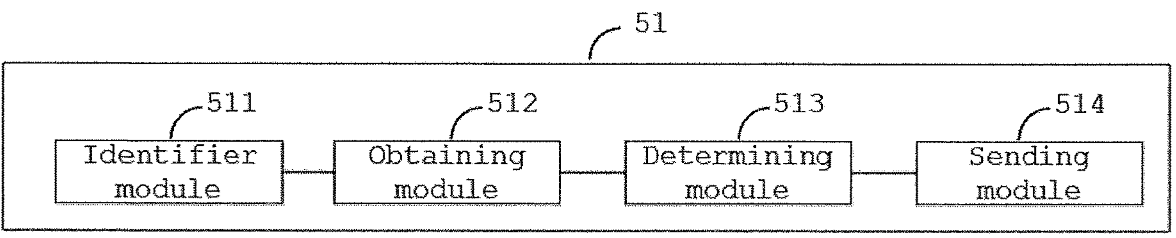
FIG. 5 is a block view showing a task processing device for a plurality of robots according to some embodiments of the present disclosure.

FIG. 5 is a block view showing a task processing device for a plurality of robots according to some embodiments of the present disclosure. The task processing device and the plurality of robots are all deployed with a first communication module for bidirectional communication between the robot and the task processing device. The plurality of robots also comprise a second communication module for bidirectional communication between the robots.

As shown in FIG. 5, the task processing device 51 for a plurality of robots comprises an identifier module 511, an obtaining module 512, a determining module 513 and a sending module 514.

The identifier module 511 is configured to identify at least one robot as a disconnected robot in case that it is detected that the heartbeat connection between the at least one robot and the task processing device is lost. For example, step S10 is performed as shown in FIG. 1.

The obtaining module 512 is configured to obtain a historical position of the disconnected robot and a current position of the connected robot among the plurality of robots, For example, step S20 is performed as shown in FIG. 1. The connected robot is a robot that maintains a heartbeat connection with the task processing device.

The determining module 513 is configured to determine a target sending robot corresponding to the disconnected robot from the plurality of robots according to a historical position of the disconnected robot and a current position of the connected robot. For example, step S30 is performed as shown in FIG. 1. The target sending robot comprises a connected robot.

The sending module 514 is configured to send the task information of a current task of the disconnected robot to the disconnected robot through the target sending robot. For example, step S40 is performed as shown in FIG. 1.

In some embodiments, the present disclosure also provides a task processing method for a plurality of robots, which is performed by a robot. The plurality of robots comprise a first communication module and a second communication module. The first communication module is configured to perform bidirectional communication between the plurality of robots and the first communication module of the task processing device. The second communication module is configured to perform bidirectional communication between the plurality of robots. For example, the first communication module is a WIFI module, and the second communication module is a LORA module.

In case that the heartbeat connection between robot and the task processing device is not lost and the robot is determined as a target sending robot corresponding to the disconnected robot, the task information of a current task of the disconnected robot sent from the task processing device is received through the first communication module, and the received task information is sent to the disconnected robot through the second communication module. The disconnected robot is a robot whose heartbeat connection with the task processing device is lost.

In case that the heartbeat connection between the robot and the task processing device is lost, the task information of a current task of the robot sent from a target sending robot corresponding to the robot is received through the second communication module. The target sending robot comprises a connected robot.

In case that the heartbeat connection between the robot and the task processing device is lost and the robot is determined as one of target sending robots corresponding to another disconnected robot than the robot, the second communication module receives the task information of a current task of the another disconnected robot sent from other target sending robots, and sends the received task information to the another disconnected robot. The another target sending robot comprises the connected robot.

In some embodiments, in case that the heartbeat connection between robot and the task processing device is not lost and the robot is not determined as a target sending robot corresponding to the disconnected robot, the task information of a current task of the robot sent from the task processing device is received through the first communication module. In some embodiments, the robot also performs a received current task of itself.

In some embodiments, the target sending robot comprises at least one robot at a distance from a corresponding disconnected robot less than or equal to a distance threshold. In case that there are a plurality of target sending robots, the series paths constituted by the plurality of target sending robots comprise a series path in which the distance between any two adjacent target sending robots is less than or equal to the distance threshold. When the distance between the robots is calculated, the disconnected robot uses a historical position, and the connected robot uses a current position. The serial path refers to a series path where the robot is located.

In the above-described embodiments, the robot is deployed with the first communication module for bidirectional communication with the task processing device, and also deployed with the second communication module for bidirectional communication with other robots, so that the robot can receive the task information in different states. Especially in case that the first communication module is not available since the robot is out of touch, the task processing device cannot send the task information of a current task to the disconnected robot, and the robot may function as the target sending robot of a disconnected robot and forward the task information of a current task to a corresponding disconnected robot. In this way, it is possible to ensure the continuity of task processing by the robot and improve the success rate of task processing. The logic of the target receiving robot is similar to that of the target sending robot.

Figure 6:
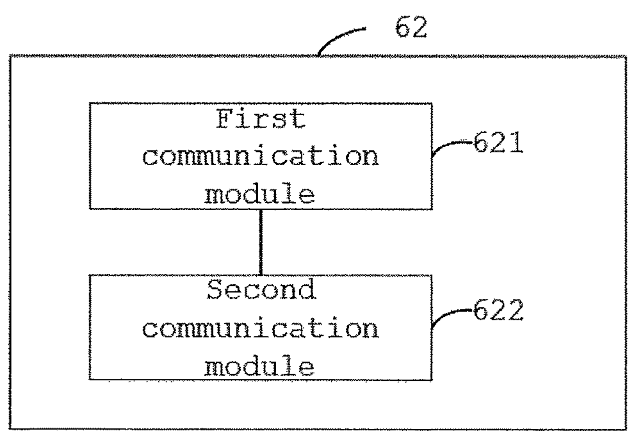
FIG. 6 is a schematic view showing the structure of a robot according to some embodiments of the present disclosure.

FIG. 6 is a schematic view showing the structure of a robot according to some embodiments of the present disclosure.

As shown in FIG. 6, the robot 62 comprises a first communication module 621 and a second communication module 622.

The first communication module 621 is configured to perform bidirectional communication with a first communication module of a task processing device. For example, the task processing device is a console or a controller.

The second communication module 622 is configured to perform bidirectional communication with a second communication module of other robots.

In case that the heartbeat connection between the robot and the task processing device is not lost and the robot is determined as a target sending robot corresponding to the disconnected robot, the task information of a current task of the disconnected robot sent from the task processing device is received through the first communication module, and the received task information is sent to the disconnected robot through the second communication module. The disconnected robot is a robot whose heartbeat connection with the task processing device is lost.

In case that the heartbeat connection between the robot and the task processing device is lost, the task information of a current task of the robot sent from the target sending robot corresponding to the robot is received through the second communication module. The target sending robot comprises a connected robot.

In case that the heartbeat connection between the robot and the task processing device is lost and the robot is determined as one of the target sending robots corresponding to the another disconnected robot than the robot, the second communication module receives the task information of a current task of another disconnected robot sent from another target sending robot, and sends the current task of the another disconnected robot to the another disconnected robot. The another target sending robot comprises the connected robot.

In some embodiments, in case that the heartbeat connection between the robot and the task processing device is not lost and the robot is not determined as a target sending robot corresponding to the disconnected robot, the task information of a current task of the robot sent from the task processing device is received through the first communication module. In some embodiments, the robot also performs a received current task of itself.

In some embodiments, the target sending robot comprises at least one robot at a distance from a corresponding disconnected robot less than or equal to a distance threshold. In case that there are a plurality of target sending robots, series paths constituted by the plurality of target sending robots comprise a series path, in which the distance between any two adjacent target sending robots is less than or equal to the distance threshold. When the distance between the robots is calculated, the disconnected robot uses a historical position, and the connected robot uses a current position.

In the above-described embodiments, the robot is deployed with the first communication module for bidirectional communication with the task processing device, and also deployed with the second module communication for bidirectional communication with other robots, so that the robot may receive task information in different states. Especially in case that the first communication module is not available since the robot is out of touch, the task processing device cannot send the task information of a current task to the disconnected robot, and the robot functions as the target sending robot of a disconnected robot, and forward the task information of a current task to the corresponding disconnected robot. In this way, it is possible to ensure the continuity of task processing by the robot and improve the success rate of task processing.

Figure 7:
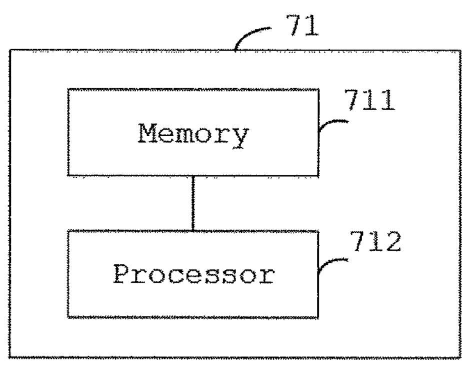
FIG. 7 is a block view showing an electronic device according to some embodiments of the present disclosure.

FIG. 7 is a block view showing an electronic device according to some embodiments of the present disclosure.

As shown in FIG. 7, the electronic device 71 comprises a memory 711; and a processor 712 coupled to the memory 711. The memory 711 is configured to store instructions for performing a corresponding embodiment of the task processing method for a plurality of robots. The processor 712 is configured to perform the task processing method for a plurality of robots according to any embodiments of the present disclosure based on the instructions stored in the memory 711.

Figure 8:
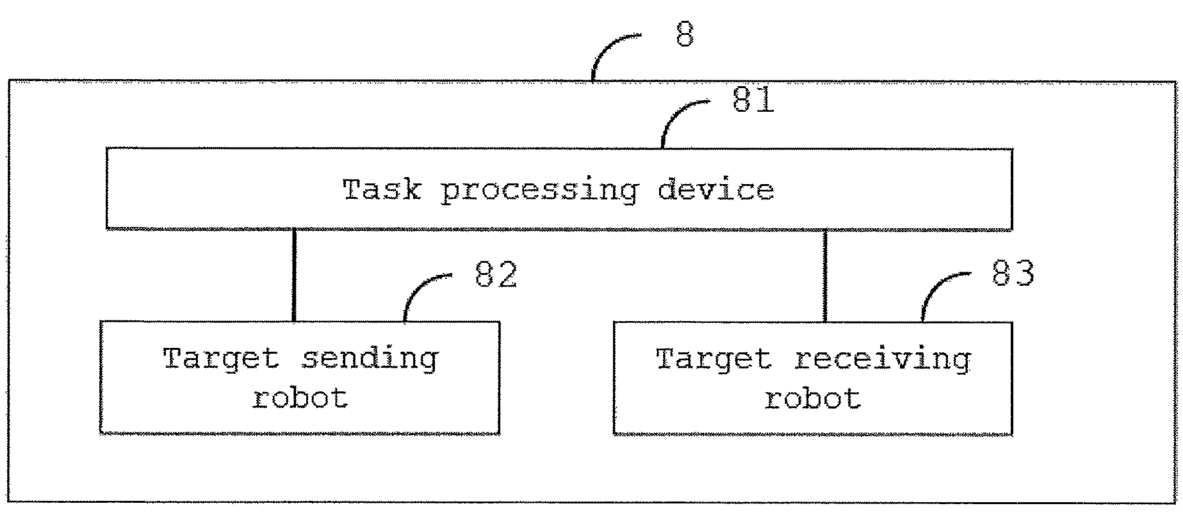
FIG. 8 is a block view showing a task processing system for a plurality of robots according to some embodiments of the present disclosure.

FIG. 8 is a block view showing a task processing system for a plurality of robots according to some embodiments of the present disclosure.

As shown in FIG. 8, the task processing system 8 comprises a task processing device 81. The task processing device 81 is, for example, a task processing device 51.

In some embodiments, the task processing system 8 further comprises a target sending robot 82. The target sending robot 82 is configured to receive the task information of a current task of disconnected robot from the task processing device through the first communication module, and send the task information of a robot current task to disconnected through the second communication module. For example, the target sending robot 82 comprises one or more robots.

In some embodiments, the task processing system 8 further comprises a target receiving robot 83. The target receiving robot 83 is configured to receive a result of performing a current task sent from disconnected robot through the second communication module, and send a result of performing a current task to the task processing device 81 through the first communication module. For example, the target receiving robot 83 comprises one or more robots.

Figure 9:
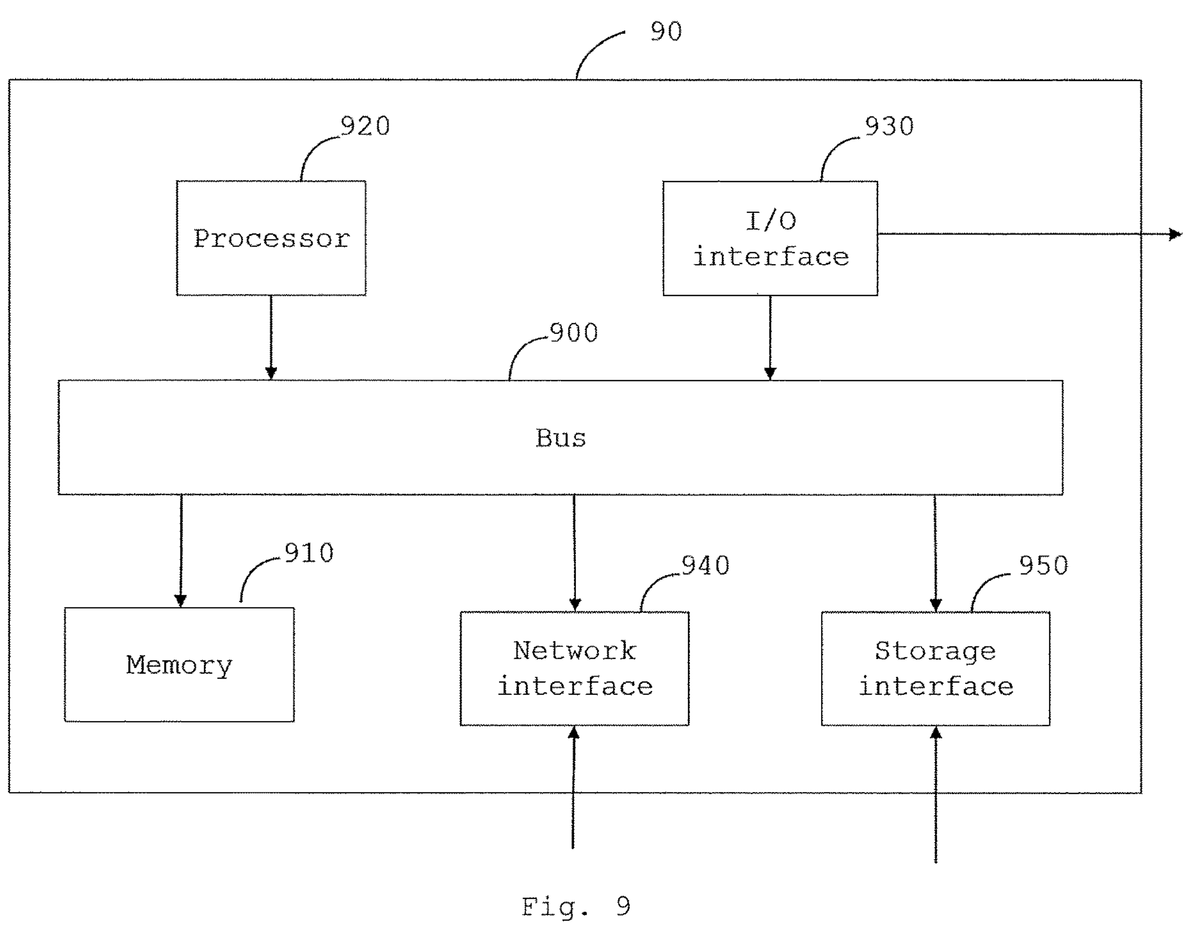
FIG. 9 is a block view showing a computer system for implementing some embodiments of the present disclosure.

FIG. 9 is a block view showing a computer system for implementing some embodiments of the present disclosure.

As shown in FIG. 9, the computer system 90 may be embodied in the form of a general-purpose computing device. The computer system 90 comprises a memory 910, a processor 920 and a bus 900 connecting different system components.

The memory 910 may comprise, for example, a system memory, a non-volatile storage medium, and the like. The system memory stores, for example, an operation system, an application, a boot loader, and other programs. The system memory may comprise a volatile storage medium, for example, a random access memory (RAM) and/or a cache memory. The nonvolatile storage medium stores, for example, instructions for performing a corresponding embodiment of at least one task processing method for a plurality of robots. The non-volatile storage medium comprises, but is not limited to, a disk memory, an optical memory, a flash memory, and the like.

The processor 920 may be implemented as a general-purpose processor, a digital signal processor (DSP), an application specific integrated circuit (ASIC), a field programmable gate array (FPGA) or other programmable logic devices, and discrete hardware components such as discrete gates or transistors. Correspondingly, each module such as a judging module and a determining module may be realized by a central processing unit (CPU) executing instructions in a memory to perform corresponding steps, or by an application-specific circuit to perform corresponding steps.

The bus 900 may use any of a plurality of bus structures. For example, the bus structures comprise, but are not limited to, an Industry Standard Architecture (ISA) bus, a Microchannel Architecture (MCA) bus and a Peripheral Component Interconnection (PCI) bus.

The computer system 90 may further comprise an I/O interface 930, a network interface 940, a storage interface 950, and the like. These interfaces 930, 940, 950 as well as the memory 910 and the processor 920 therebetween may be connected through a bus 900. The I/O interface 930 may provide a connection interface for input/output devices such as a display, a mouse, a keyboard, and a touch screen. The network interface 940 provides a connection interface for various networked devices. The storage interface 950 provides a connection interface for an external storage device such as a floppy disk, a USB flash disk and an SD card.

Here, various aspects of the present disclosure are described in conjunction with flowcharts and/or block views of methods, apparatuses and computer program products according to the embodiments of the present disclosure. It should be understood that, each block of the flowchart and/or block view, and a combinations of blocks, may be implemented by computer-readable program instructions.

These computer-readable program instructions may be provided to a processor of a general-purpose computer, a special-purpose computer or other programmable devices to produce a machine, so that the instructions are executed by the processor to produce a device which realizes the functions specified in the flowchart and/or one or more blocks in the block view.

These computer-readable program instructions may also be stored in a computer-readable memory that cause a computer to function in a particular manner so as to produce a manufacture, comprising instructions that realize the functions specified in the flowchart and/or one or more blocks in the block view.

The present disclosure may take the form of a hardware only embodiment, a software only embodiment, or an embodiment combining software and hardware aspects.

By way of the task processing method, device and system for a plurality of robots, a robot and a non-transitory computer-readable medium in the above-described embodiments, it is possible to ensure the continuity of task processing by the robot and improve the success rate of task processing.

So far, the task processing method, device and system for a plurality of robots, a robot and a computer storage medium according to the present disclosure have been described in detail. Some details well known in the art are not described in order to avoid obscuring the concept of the present disclosure. According to the above-described description, those skilled in the art would fully understand how to implement the technical solutions disclosed here.

What is claimed is:

1. A task processing method for a plurality of robots, which is performed by a task processing device, wherein the task processing device and the plurality of robots are both deployed with a first communication module configured to perform bidirectional communication between the plurality of robots and the task processing device, the plurality of robots further comprise a second communication module configured to perform bidirectional communication between the plurality of robots, and the task processing method comprises:

identifying at least one robot of the plurality of robots as a disconnected robot in case that a heartbeat connection between the at least one robot and the task processing device is detected to be lost;

obtaining a historical position of the disconnected robot and a current position of a connected robot of the plurality of robots, wherein the connected robot is a robot that maintains a heartbeat connection with the task processing device;

for the disconnected robot, determining a target sending robot corresponding to the disconnected robot from the plurality of robots according to the historical position of the disconnected robot and a current position of the connected robot, wherein the target sending robot comprises the connected robot, wherein the determining the target sending robot corresponding to the disconnected robot from the plurality of robots comprises:

obtaining a historical position of another disconnected robot than the disconnected robot in case that each of distances between current positions of connected robots and a historical position of the disconnected robot is greater than a distance threshold;

determining the another disconnected robot, of which a historical position is at a distance from the historical position of the disconnected robot less than or equal to the distance threshold as a candidate disconnected robot according to the historical position of the another disconnected robot;

determining the connected robot of which a current position is at a distance from a historical position of the candidate disconnected robot less than or equal to the distance threshold as a candidate connected robot according to the historical position of the candidate disconnected robot and the current position of the connected robot; and determining a target disconnected robot and a target connected robot corresponding to the disconnected robot from the candidate disconnected robot and the candidate connected robot as the target sending robot respectively; and sending task information of a current task of the disconnected robot to the disconnected robot through the target sending robot.

2. The task processing method according to claim 1, wherein the sending the task information of the current task of the disconnected robot to the disconnected robot through the target sending robot comprises:

sending the task information of the current task of the disconnected robot to the disconnected robot through the target connected robot and the target disconnected robot sequentially.

3. The task processing method according to claim 1, further comprising:

sending task information of a current task of the target disconnected robot to the target disconnected robot through the target connected robot.

4. The task processing method according to claim 1, further comprising:

determining a target receiving robot corresponding to the disconnected robot from the plurality of robots, wherein the target receiving robot is configured to receive a result of performing a current task sent from the disconnected robot through the second communication module; and receiving the result of performing the current task through the target receiving robot, wherein the target receiving robot comprises the connected robot.

5. The task processing method according to claim 4, wherein the receiving the result of performing the current task by the target receiving robot comprises:

receiving the result of performing the current task sent from the target receiving robot in case that the target receiving robot only comprises the connected robot; and receiving the result of performing the current task through the disconnected robot of the target receiving robot and the connected robot of the target receiving robot sequentially in case that the target receiving robot comprises the disconnected robot and the connected robot.

6. The task processing method according to claim 4, wherein the target receiving robot and the target sending robot are completely same, partially same or completely different.

7. The task processing method according to claim 1, wherein the determining the target sending robot corresponding to the disconnected robot from the plurality of robots comprises:

determining the target sending robot corresponding to the disconnected robot from at least one connected robot in case that the distance between a current position of the at least one connected robot and the historical position of the disconnected robot is less than or equal to the distance threshold.

8. The task processing method according to claim 7, wherein the determining the target sending robot corresponding to the disconnected robot from the at least one connected robot comprises:

determining the connected robot of which a current position is at the shortest distance from the historical position of the disconnected robot from the at least one connected robot as the target sending robot corresponding to the disconnected robot.

9. The task processing method according to claim 1, wherein a difference between a wireless propagation distance of the second communication module and a wireless propagation distance of the first communication module is greater than a difference threshold under a same power consumption, where the difference and the difference threshold are positive integers.

10. The task processing method according to claim 9, wherein a current task is a follow task, and the second communication module is further configured to exchange real-time motion parameters, positions and road condition information between the plurality of robots performing the follow task.

11. The task processing method according to claim 10, wherein the motion parameters comprise at least one of a velocity, an acceleration or a direction.

12. The task processing method according to claim 1, wherein the first communication module is a WIFI module, and the second communication module is a long-range radio LORA module.

13. A task processing method for a plurality of robots comprising a first communication module and a second communication module, wherein the first communication module is configured to perform bidirectional communication between the plurality of robots and a first communication module of a task processing device, and the second communication module is configured to perform bidirectional communication between the plurality of robots, the task processing method is performed by a robot of the plurality of robot, and the task processing method comprises:

receiving task information of a current task of a disconnected robot sent from the task processing device through the first communication module, and sending the task information of the current task of the disconnected robot to the disconnected robot through the second communication module in case that a heartbeat connection between the robot and the task processing device is not lost and the robot is determined as a target sending robot corresponding to the disconnected robot, wherein the disconnected robot is a robot whose heartbeat connection with the task processing device is lost;

receiving task information of a current task of the robot sent from the target sending robot corresponding to the robot through the second communication module in case that a heartbeat connection between the robot and the task processing device is lost, wherein the target sending robot comprises a connected robot; and in case that a heartbeat connection between the robot and the task processing device is lost and the robot is determined as a target sending robot corresponding to another disconnected robot, receiving task information of a current task of the another disconnected robot sent from another target sending robot through the second communication module, and sending the task information of the current task of the another disconnected robot to the another disconnected robot wherein the another target sending robot comprises the connected robot.

14. The task processing method according to claim 13, wherein the target sending robot comprises at least one robot at a distance from a corresponding disconnected robot less than or equal to a distance threshold, and in case that there are a plurality of target sending robots, series paths constituted by the plurality of target sending robots comprise a series path, in which the distance between any two adjacent target sending robots is less than or equal to the distance threshold.

15. An electronic device, comprising:

a memory; and a processor coupled to the memory, wherein the processor is configured to perform the task processing method according to claim 1 based on instructions stored in the memory.

16. A non-transitory computer-readable medium having computer program instructions stored thereon that, when executed by a processor, implement the task processing method according to claim 1.

* * * * *